Oct. 24, 1933.   G. J. MERCER   1,932,290
BRAKE TESTING MACHINE
Filed July 16, 1928   2 Sheets-Sheet 1

INVENTOR
George J. Mercer
BY
Parker & Burton
ATTORNEYS

Oct. 24, 1933. G. J. MERCER 1,932,290
BRAKE TESTING MACHINE
Filed July 16, 1928  2 Sheets-Sheet 2

INVENTOR
George J. Mercer
BY Parker & Burton
ATTORNEYS

Patented Oct. 24, 1933

1,932,290

UNITED STATES PATENT OFFICE 1,932,290

BRAKE TESTING MACHINE

George J. Mercer, Detroit, Mich., assignor, by mesne assignments, to Bendix-Cowdrey Brake Tester, Inc., New York, N. Y., a corporation of Delaware Application July 16, 1928. Serial No. 293,113

12 Claims. (Cl. 73—51)

My invention relates to brake testing machines.

An object is to provide an improved brake testing machine adapted primarily for employment in testing the brakes of a motor vehicle and capable of indicating the relative efficiency of the brake mechanism associated with each of the several road wheels of the vehicle so that said mechanism may be adjusted as desired to prove most effective.

I provide a rotatable support for each road wheel of the vehicle adapted to engage and support said wheel when the vehicle is mounted upon the machine and certain of which supports are adjustable with respect to others to accommodate vehicles of different wheel base and an important feature of my invention resides in the provision of means to control or limit the adjustable movement of said rotatable supports which means is responsive to the weight of the vehicle itself when received upon said supports and preferably directly responsive to the weight of the wheels received upon the stationary supports.

Another important advantage resides in the provision in a testing machine of this character having rotatable supports to engage the road wheels of the vehicle which are adapted to be driven by power mechanism to drive said road wheels against the brake resistance imposed thereon by the brake mechanism of the vehicle, of direct current series motors, one for each rotatable support, connected in parallel with a suitable source of direct current to be driven thereby so that the several road wheels will be driven at rates of speed proportional to the torque resistance imposed thereon by their corresponding brakes.

Other objects, advantages, and meritorious features of my invention will more fully appear from the following description, appended claims and accompanying drawings, wherein—

Figure 1:
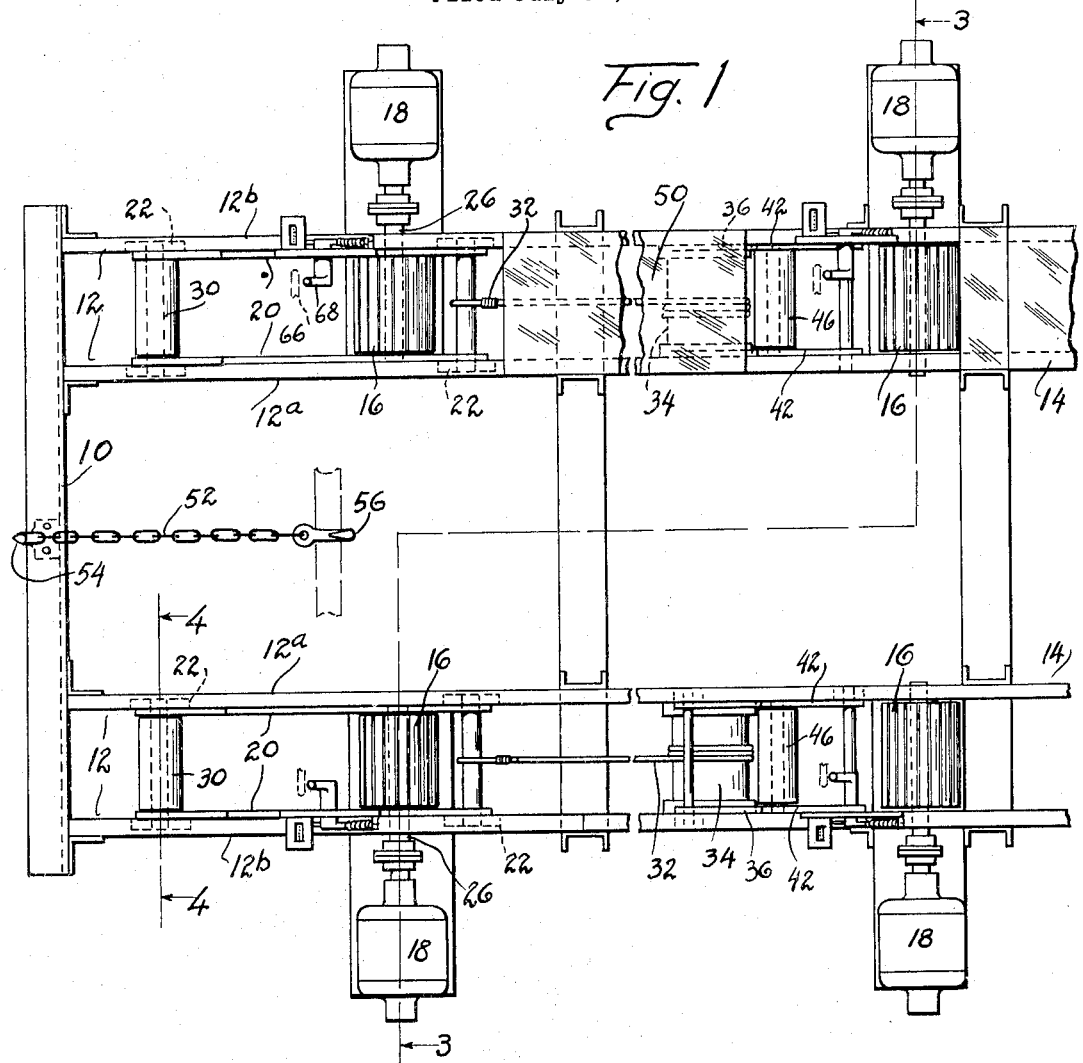
Fig. 1 is a plan partly broken away of a testing machine embodying my invention.
Figure 2:
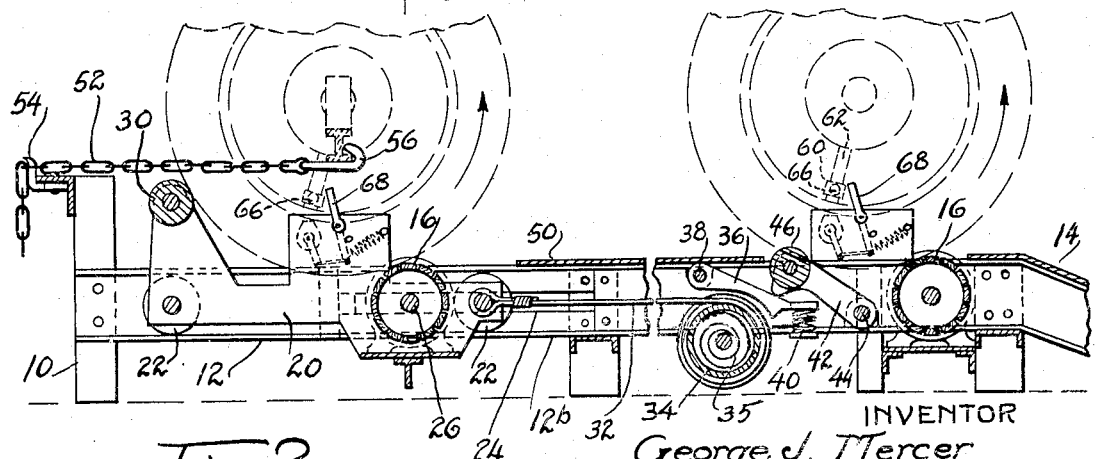
Fig. 2 is a sectional side elevation taken approximately midway between the track members shown in Fig. 1.

My invention is embodied in a brake testing machine adapted to be supported in a suitable place as upon the floor of a garage and upon which a road vehicle may be driven to have its brakes tested. It comprises a frame structure indicated generally as 10 which includes a pair of spaced apart channel tracks 12. At one end are ramp members 14 over which a vehicle may be driven to pass upon the track members 12.

These track members are here shown as consisting of spaced apart opposed channel sections 12$^a$ and 12$^b$ which together constitute the unitary track member and are held and supported by the frame members indicated generally as 10.

I provide a front pair and a rear pair of individually rotatable supports 16 adapted to engage the front and rear road wheels of a vehicle, the brakes of which are to be tested. Each rotatable support is so formed as shown as to have good frictional contact with the periphery of the tire of the road wheel of the vehicle and each support is individually driven by a direct current series motor 18.

Figure 3:
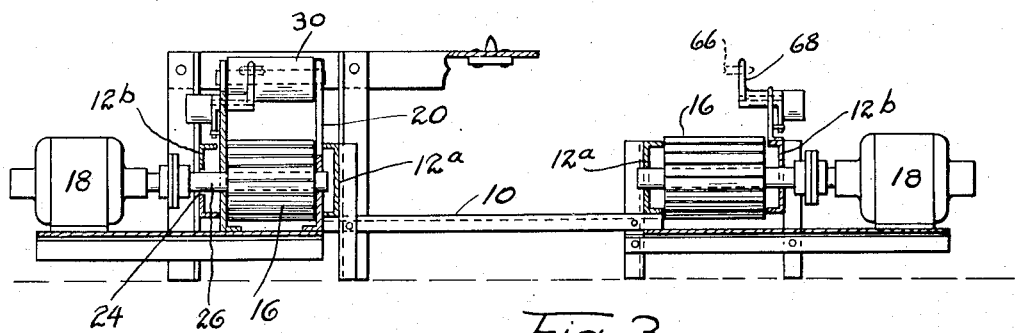
Fig. 3 is a sectional view taken on line 3—3 of Fig. 1.
Figure 4:
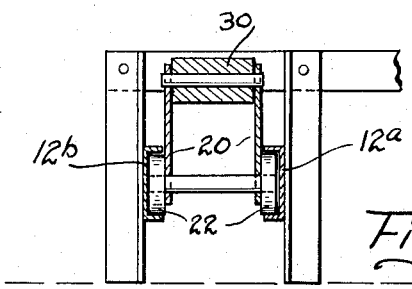
Fig. 4 is a sectional view taken on line 4—4 of Fig. 1.
Figure 5:
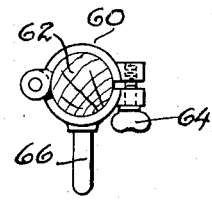
Fig. 5 is a cross-sectional view through a wheel spoke showing a counter device carried thereon.

In the construction shown the rear pair of rotatable supports are stationary and each member of the front pair of rotatable supports is carried by a carriage 20. This carriage is adapted to travel slidably over the channel track member 12 between the two sections 12$^a$ and 12$^b$ thereof as indicated in Figs. 3 and 4, and is provided with rollers 22 to facilitate this movement. The outer side of the channel track is slotted as at 24 so that the driving shaft 26 of the rotatable supports 16 may extend through said slot to be coupled with the motor 18 and to travel through the slot as the carriage is moved adjustably from one position to the other.

The stationary rear rotatable supports have their shafts extending through the side members 12$^a$ and 12$^b$ of the track as indicated. The motors 18 which drive the front rotatable supports are carried by the carriages upon which said supports are mounted as shown in Fig. 3. Each carriage is provided with an elevated roll 30 adapted to engage the road wheel of the vehicle to limit its movement over the carriage.

An advantageous feature of my invention resides in the provision of control mechanism to limit the adjustable travel of each carriage and this consists in a tension connection 32 secured at one end to the carriage and wound about a rotatable drum 34 within which is disposed a spring 35 to wind the cable 32 about the drum and to draw the carriage toward the drum.

The rotation of this drum is retarded by a pair of friction brake members 36 each of which is pivoted at 38 to the side members of the track and held away from the drum by a spring 40 but adapted to be urged against the drum to retard its rotation by an arm 42 pivoted to the frame at 44. A roller 46 is carried between the outer free ends of the arms 42 and is adapted to be engaged by the road wheel of the vehicle so that the weight thereof forces the arms 42 downwardly and forces the members 36 against the drum 34 to retard its rotation and limit the forward movement of the carriage.

It will be understood that normally the carriage is drawn rearwardly so that the roller 16 is in close proximity to the forward end of the upper plate 50 which bridges the space between the side members 12$^a$ and 12$^b$ of the track forwardly of the rear rotatable supports and that the front road wheels of the vehicle travel over this plate on to the carriage and then force the carriage along until the rear road wheels of the vehicle pass over the rear rotatable supports and bear upon the rolls 46, which serve as hereinbefore described to retard the rotation of the drum and determine the adjustable movement of the carriage.

A chain 52 or other suitable fastening means is secured to a hook 54 at the front end of the machine and has at one end a hook 56 to engage the front axle of the vehicle to hold it in place upon the brake testing machine.

I provide a plurality of counting devices, one for each road wheel of the vehicle, adapted to count the number of revolutions of each road wheel while being tested. A convenient embodiment of this structure is to provide a part such as a clamp 60 adapted to be clamped about one of the spokes 62 of the road wheel. I have here shown a conventional clamp provided with a thumb screw 64 and which has a projecting portion 66 adapted to operatively engage an operating part 68 of suitable counting mechanism such as a Veeder counter to count the revolutions of the road wheel.

Each rotatable support is driven by a direct current series motor 18 as heretofore stated and these motors are connected in parallel with a suitable source of direct current such as a direct current generator 70, and the circuit may be controlled by a switch 72.

Figure 6:
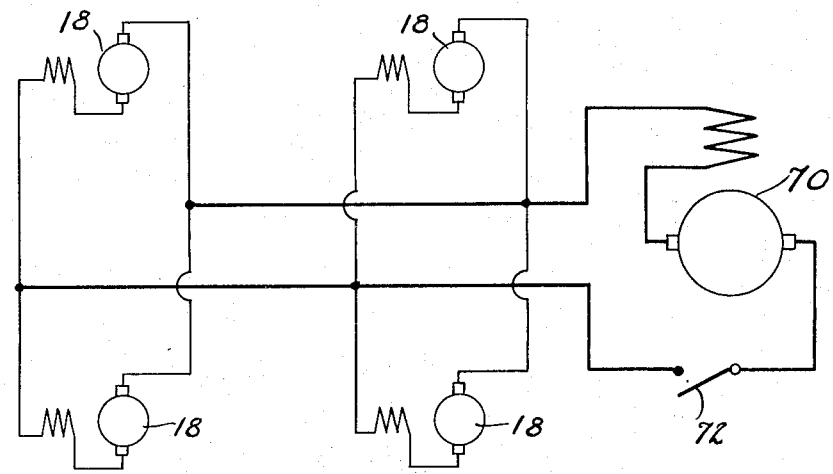
Fig. 6 is a diagrammatic view of the electric circuit.

There is a lead from the generator to each of these motors as indicated diagrammatically in Fig. 6 and as a result the motors drive the several road wheels at a rate of speed proportional to the resistance imposed by the brake mechanism of the several wheels.

With a direct current series motor the several road wheels would be driven at the same rate of speed if the resistance imposed thereby were equal but when this varies the rate of rotation will vary and this variance will be measured by the counters, and the extent of the period of time through which the test is made does not matter because the proportionate result will be the same as all motors will be running for the same period of time.

What I claim is:

1. A brake testing machine for a road vehicle having a front pair and a rear pair of road wheels, said machine comprising correspondingly arranged front and rear pairs of individually rotatable supports for each of said wheels, said front pair of rotatable supports being slidably adjustable with respect to the rear pair of rotatable supports, and means operatively connected with said front pair of rotatable supports and adapted to be operated by the rear wheels of a vehicle when received upon said rear pair of rotatable supports to limit the adjustable movement of said front rotatable supports.

2. A brake testing machine for a vehicle having front and rear road wheels, said machine comprising correspondingly arranged front and rear rotatable supports for said wheels, one of said supports being slidably adjustable with respect to the other to accommodate vehicles of different wheel base, and means operatively connected with said adjustable support to limit its relative adjustment automatically operable by the rear wheel when in position on the other support.

3. A brake testing machine for a vehicle having front and rear road wheels, said machine comprising correspondingly arranged front and rear rotatable supports for said wheels, one of said supports being slidably adjustable with respect to the other to accommodate vehicles of different wheel base; control mechanism operatively connected with said adjustable support to limit its adjustable movement, said control mechanism being automatically operatively responsive to one of the rear road wheels of the vehicle on the stationary support.

4. A brake testing machine for a vehicle having front and rear road wheels, said machine comprising correspondingly arranged front and rear rotatable supports for said wheels, one of said supports being slidably adjustable with respect to the other to accommodate vehicles of different wheel base, control mechanism operatively connected with said adjustable support to limit its adjustable movement, said control mechanism being automatically operatively responsive to the weight imposed thereon by one of the rear road wheels of the vehicle on the stationary support.

5. A brake testing machine for a vehicle having front and rear road wheels, said machine comprising correspondingly arranged front and rear rotatable supports for said wheels, one of said supports being slidably adjustable with respect to the other to accommodate vehicles of different wheel base, control mechanism operatively connected with said adjustable support to limit its adjustable movement, said control mechanism being automatically operatively responsive to the weight of the vehicle when the wheels thereof are in position on both supports.

6. A brake testing machine for a vehicle having front and rear road wheels, said machine comprising correspondingly arranged front and rear rotatable supports for said wheels, one of said supports being slidably adjustable with respect to the other to accommodate vehicles of different wheel base, control mechanism operatively connected with said adjustable support having a part adapted to be acted upon by one of the rear road wheels of the vehicle when in position on said supports to limit said adjustable movement.

7. A brake testing machine for a road vehicle having a front pair and a rear pair of road wheels, said machine comprising correspondingly arranged front and rear pairs of individually rotatable supports for said wheels, said front pair of rotatable supports being slidably adjustable with respect to the rear pair of rotatable supports, control mechanism operatively connected with said front pair of rotatable supports including a part adapted to be acted upon by each rear wheel of the vehicle when in position upon said supports to determine the adjustable movement of said front pair of rotatable supports.

8. A brake testing machine for a road vehicle having a front pair and a rear pair of road wheels, said machine comprising correspondingly arranged front and rear pairs of individually rotatable supports for said wheels, said front pair of rotatable supports mounted upon traveling carriages adjustable with respect to the rear pair of adjustable supports to accommodate vehicles of different wheel base, tracks for said traveling carriages, and control mechanism operatively connected with said front supports extending along said tracks toward the rear pair of rotatable supports operable by the weight of the rear wheels of the vehicle when in position upon said rear supports to determine the adjusted position of the front pair of rotatable supports.

9. A brake testing machine for a road vehicle having a front pair and a rear pair of road wheels, said machine comprising correspondingly arranged front and rear pairs of individually rotatable supports for said wheels, said front pair of rotatable supports mounted upon traveling carriages adjustable with respect to the rear pair of adjustable supports to accommodate vehicles of different wheel base, tracks for said traveling carriages, control mechanisms including tension elements connected with said traveling carriages and extending along said tracks toward the rear pair of rotatable supports, and means engaging said tension element automatically operable by the vehicle to limit the adjustable movement of said front pair of rotatable supports.

10. A brake testing machine for a vehicle having front and rear wheels, comprising a stationary wheel support, a movable wheel support, means urging the movable support toward the stationary support, an abutment on the movable support adapted to contact with the vehicle wheel for moving the support against the force of the resisting means, and means adapted to hold the vehicle on the supports.

11. A brake testing machine for a vehicle having front and rear wheels, comprising a stationary wheel support, a movable wheel support, means urging the movable support toward the stationary support, braking means for the movable support adapted to be actuated by the vehicle, an abutment on the movable support adapted to contact with the vehicle wheel for moving the support against the force of the resisting means, and means adapted to hold the vehicle on the supports.

12. A brake testing machine for a vehicle having front and rear wheels, comprising a stationary support, a movable support having an abutment adapted to contact with the vehicle and be moved thereby, a spring urging the movable support toward the stationary support, and means for applying a brake to the resilient means adapted to be actuated by the vehicle.

GEORGE J. MERCER.